Sept. 3, 1968 H. HEYMANN 3,400,389

CODE CONVERSION

Filed Sept. 25, 1964 2 Sheets-Sheet 1

INVENTOR
HANS HEYMANN
BY: Toulmin & Toulmin
ATTORNEYS

INVENTOR
HANS HEYMANN
BY: Toulmin & Toulmin
ATTORNEYS

United States Patent Office 3,400,389
Patented Sept. 3, 1968

3,400,389
CODE CONVERSION

Hans Heymann, Wilhelmshaven, Germany, assignor to Olympia Werke AG, Wilhelmshaven, Germany
Filed Sept. 25, 1964, Ser. No. 399,305
Claims priority, application Germany, Oct. 11, 1963, O 9,722
10 Claims. (Cl. 340—347)

ABSTRACT OF THE DISCLOSURE

A code converter including first and second groups of conductors for carrying first and second sets of digital signals expressing data in first and second digital codes respectively, a first group of AND-circuits having their inputs coupled to corresponding conductors of the first group of conductors in accordance with the first digital code, a second group of AND-circuits having their inputs coupled to corresponding conductors of the second group of conductors in accordance with the second digital code, with the output of each AND-circuit in the first group being coupled to the output of a corresponding AND-circuit in the second group. A third group of conductors is coupled to the outputs of the AND-circuits for carrying a third set of digital signals expressing data in a third digital code. The AND-circuits transmit signals in both directions so as to enable conversion of any one of the three codes into the other two codes.

Figure 1:
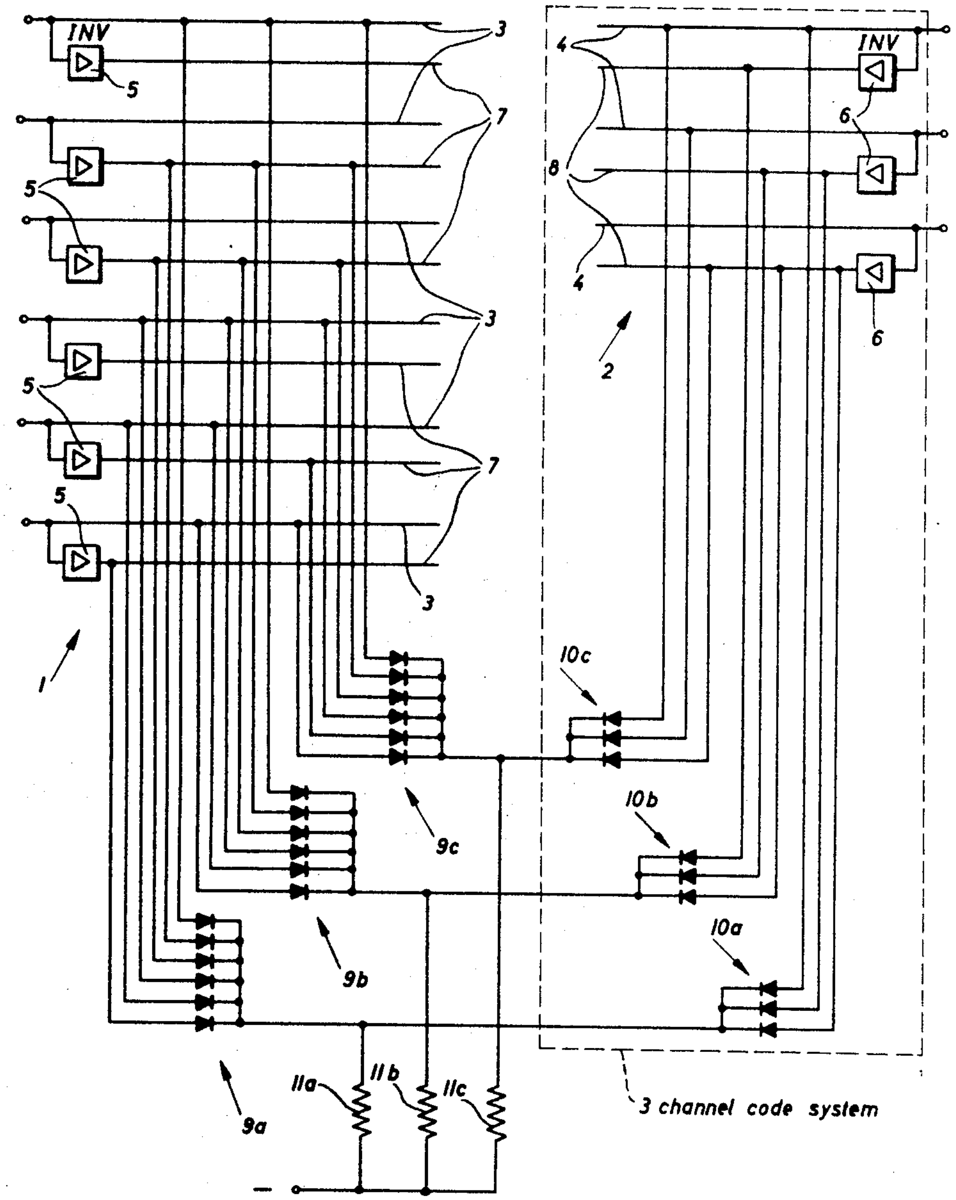

Two parallel conversion systems called "parallel channels" are generally used interchangeably for the transfer of a plurality of simultaneously operable signal channels. The invention is also applicable to the special case where only one of the two systems is connected with the code converter through a plurality of parallel channels while the other system is connected to the converter by only one channel selected from a plurality of channels. In such a case a combination code, e.g. an ($m$ out of $n$)-code is used in the first system and an exclusive selection code (1 out of $n$) in the second case, e.g. the decimal code. In such a case it is customary to call the transfer of information from the exclusive code (decimal) to the combination code (binary) as "encoding," and to reverse transfer as "decoding."

Of the large number of known codifying circuits, the important ones in this relation are those which have an AND circuit in the active channels of the sending system for every combination of elementary signals such as binary signals that are to be converted. Such prior art circuits are disclosed in U.S. Patent No. 3,021,065. Their operation which occurs through a group of decoupling diodes is by way of the corresponding combination of channels, or in the case of a (1 out of $n$)-system by way of the corresponding single channel of the receiving system. If such a decoder with equal conversion is to be operated in both directions, as encoder and decoder, then ordinarily for every signal combination two AND circuits and also two groups of decoupling diodes are required, one of the AND-circuits and one group of decoupling diodes being used for transmission in each direction. In such a case the cost of the circuit is about twice the cost of a corresponding circuit for transmission in only one direction.

In contrast thereto, the purpose of this invention is to provide a codifier that is operable in either direction but the cost of which will be considerably reduced. For this purpose use is made of a code converter for the transfer of oppositely directed and differently codified binary signal groups between systems of signal channels at least some of which operate in parallel, wherein the different signal combinations are delivered to AND-circuits whose inlets operate with a positive impulse or a negative impulse in accordance with the individual binary signals and are connected to the individual signal channels either directly or through inverters.

The solution of this problem by the present invention is characterized essentially in that for every signal combination that is used in each of the connected systems, an AND-circuit is provided whose outlet is connected to the outlet of the associated AND-circuit in the opposite system so that a signal voltage delivered to the corresponding inlets can be transmitted, while the inlets are blocked against one another from such signal voltages.

In this manner for every signal combination in each of the two systems only one AND-circuit is needed which at its outlet effects the decoding of the approaching signal combinations while during sending the same circuit effects the necessarv blocking of the signal channels of the outlet system. The result will be a lowering of the cost of the circuit elements to about half of their cost in the usual systems.

Figure 2:
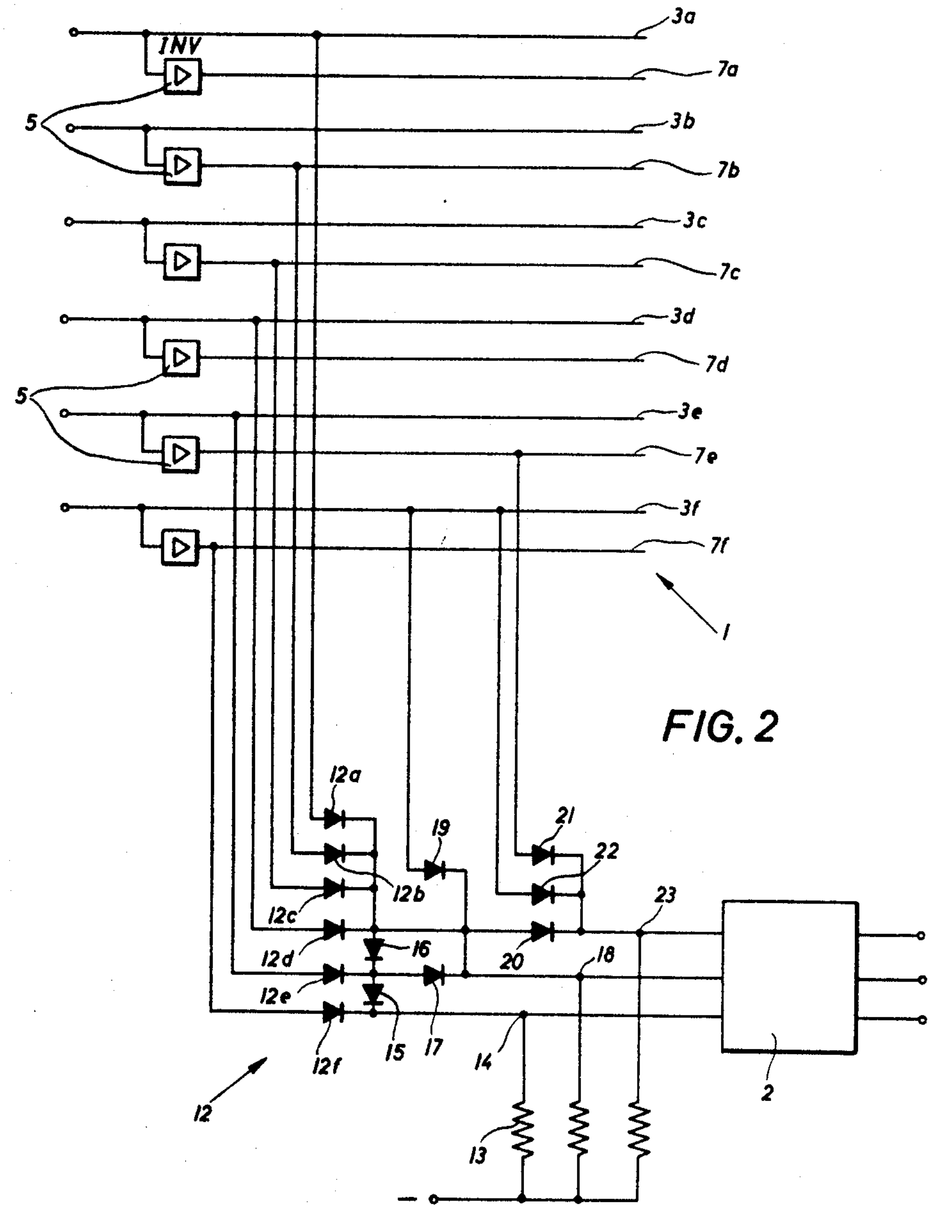

FIGURE 1 is the fundamental circuit of a code transposer between a six-channel system and a three-channel system, operable in either direction; and FIGURE 2 is a specific modification of the code transposer of FIGURE 1.

The code converter of FIGURE 1 is for the transfer of simultaneous binary signal combinations between a six-channel system 1 and a three-channel system 2. Each signal channel has besides a normal positive impulse connection over conductors 3 and 4 also a negative impulse conection over the inverters 5 and 6 and the associated conductors 7 and 8. Every bit-combination that could possibly occur in the two systems will be directed toward one of the AND-circuits 9*a–c* or 10*a–c* formed in the usual manner of diodes whose inlets are connected to the conductors 3, 7 and 4, 8 according to the values of the bits. The AND-circuits of the two systems which are directed to bit combinations of equal value are connected by their outlets in pairs to their respective resistors 11*a–c* and from there to the negative terminal of a source of electricity.

It is assumed here that a positive potential on one of the signal conductor 3 or 4 corresponds to the resting condition and, therefore, e.g., to the symbol 0, whereas a negative potential on these conductors corresponds to the working condition and to the symbol 1. The same is also true of the outlets of inverters 5 and 6, but in the opposite direction from the signals in conductors 3 and 4. In the specific embodiment illustrated in FIGURE 1, only three AND-circuits are shown while any number of AND-circuits can be used, depending on the maximum number of bit combinations on the two sides. Applicant does not wish to be limited to the specific embodiments shown.

If on a conductor 3 of system 1 a bit combination occurs which corresponds to one of AND-circuits 9*a*, then the diodes which are directly connected to that conductor will be in opposition to the negative potential of the source of electricity imposed on their anodes. (The same is also true of one of the diodes connected to conductors 7, since the latter will likewise be kept under negative potentials by inverters 5 when positive potentials are on the associated conductors 3.) The output of 9*a* being balanced by the potential from 11*a*, a signal current flows from the associated conductor 4 of system 2 over the opened diodes of the AND-circuit 10*a* and from there over the corresponding resistor to the minus terminal of the source of electricity whereby the signal will be delivered to the receiving system 2.

It is to be noted that in both systems while in their resting conditions, a residual current flows across each of the diodes which are connected directly to conductors 3 and 4, which together with the current approaching from the opposite side through the corresponding resistor 11*a–c*, causes a drop of potential which is substantially equal to the difference between the positive resting potential and the negative blocking potential. The delivery of a signal to a receiving conductor is therefore equivalent to a 1:2 change from the residual current to the working current. The delivery of such a signal is equivalent to a change from a zero residual current to a final working current.

The detection of the two current strengths can be facilitated by the use of a suitable discriminator with a non-linear current voltage curve.

The essential characteristic of this circuit consists of the double use that is made on the one hand of a bit combination received by the system for selection by an AND-circuit, and on the other hand of the uncoupling of the outgoing signal conductors in the second system. Since the AND-circuits in the two systems are of similar construction, a reversal of the direction of transmission will not necessitate any changes in the systems.

The circuit of FIGURE 2 differs from the circuit of FIGURE 1 in that it requires fewer diodes for performing the same function. The inlets of diodes 12 are connected directly to conductors 3*a–f* and to negatived conductors 7*a–f*. In this system the AND-circuit with the conductors in the order 3*a–f* corresponds to the bit combination 100110, which is to be converted into a similar bit combination in system 2. The latter agrees exactly with the portion of FIGURE 1 that is enclosed in the dotted rectangle of FIGURE 1. When the corresponding bit combination is received in system 1, all the diodes 12*a–f* of the AND-circuit 12 will be blocked by negative potentials at their anodes. The potential of the point 14 at the resistor 13 will thereby be lowered to the potential of the minus terminal, whereby the current flows from AND-circuits 10*a–c* and the signal released in system 2. When bit combination 100111 appears in system 1, corresponding to the AND-circuit 9*b* of FIGURE 1, only the diodes 12*a–e* of the diode circuit 12 will be blocked, while diode 12*f* will remain conducting and will keep the current portion from system 2 over resistor 13 at its residual value. At the same time an additional decoupling diode 15 is blocked by a voltage drop in a direction opposite to its direction of current flow, so that the diode 12*f* will be separated from the diodes 12*a–e* by a high resistance.

The diode group 12*a–e* corresponding to the partial bit combination 100111 is connected through another decoupling diode 17 to the point 18 whose potential is also determined through diode 19 by the potential of an AND-circuit of conductor 3*f*. Upon the occurrence of a bit combination 100111 which differs from the last-mentioned only in its final binary place, only the potential at point 18 but not that at point 14 will be influenced. Thereby the conversion of this bit combination into the corresponding signal of system 2 will occur without change, but by the use of diode groups 12*a–e* for both bit combinations.

This multiple use of diode groups in FIGURE 2 can also be accomplished by further subdivision of the first AND-circuit 12 into those partial bit combinations which are common to a plurality of combined signals.

Thus, for example, diodes 12*a–d* are connected to the conductors of system 1 in such a manner that they serve at the same time for the partial combination 1001. The said diodes are therefore separated by another decoupling diode 16 from the remaining diodes of the AND-circuit 12, and by a diode 20 with two further diodes 21, 22 connected to conductors 7*e* and 3*f*, are combined into a diode combination which corresponds to a third binary signal 100101. The controlling of the potential at the circuit point 23 and the resulting delivery of the signal to system 2 is the same as in FIGURE 1.

In FIGURE 2 the saving of diodes, in spite of the arbitrary restriction to three binary signals, is already in the ratio of 18:13 with six bit channels, which means a saving of about 30%. By making general use of this switching principle in all the bit combinations that are in common use, it is possible to effect a substantial saving of current-controlling diodes, especially with greater numbers of digit places.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A two-way digital code converter for converting a first set of digital signals expressing data in a first digital code into a second set of digital signals expressing the same data in a second digital code, and vice versa, comprising, in combination:

(a) a first plurality of conductors for carrying said first set of digital signals;

(b) a second plurality of conductors for carrying said second set of digital signals;

(c) a first plurality of logic circuits each having a plurality of inputs and an output and each operable to produce a signal on the output thereof when a predetermined combination of the inputs thereof is energized and to produce a signal on each input of said predetermined combination thereof when the output thereof is energized, the inputs of each of said logic circuits being coupled to corresponding conductors of said first set of conductors in accordance with said first digital code;

(d) a second plurality of logic circuits each having a plurality of inputs and an output and each operable to produce a signal on the output thereof when a predetermined combination of the inputs thereof is energized and to produce a signal on each input of said predetermined combination thereof when the output thereof is energized, the inputs of each of said logic circuits being coupled to corresponding conductors of said second set of conductors in accordance with said second digital code; and (e) the output of each logic circuit of said first plurality of thereof being coupled to the output of a corresponding logic circuit of said second plurality thereof, whereby the application of a first set of digital signals to said first plurality of conductors produces a corresponding second set of digital signals in said second plurality of conductors, and the application of a second set of digital signals to said second plurality of conductors produces a corresponding first set of digital signals in said first plurality of conductors, thereby converting said digital signals from said first digital code to said second digital code and vice versa.

2. A two-way digital code converter as defined in claim 1 wherein each logic circuit in said first and second plurality of logic circuits comprises an AND-circuit.

3. A two-way digital code converter as defined in claim 1 wherein said first and second plurality of conductors each contains twice as many conductors as there are signals in the corresponding set of digital signals, said conductors being associated together in pairs, and further comprising a signal inverter coupled between each pair of conductors, whereby each pair of conductors carries one digital signal of the corresponding set of digital signals and the inverse of said one digital signal.

4. A two-way digital code converter as defined in claim 3 wherein each logic circuit in said first and second plurality of logic circuits comprises an AND-circuit.

5. A two-way digital code converter as defined in claim 4 wherein each of said AND-circuits comprises a diode AND-circuit.

6. A three-way digital code converter for converting a first set of digital signals expressing data in a first digital code into second and third sets of digital signals expressing the same data in second and third digital codes respectively, and for converting a second set of digital signals expressing data in the second digital code into first and third sets of digital signals expressing the same data in the first and third digital codes respectively, and for converting a third set of digital signals expressing data in the third digital code into first and second sets of digital signals expressing the same data in the first and second digital codes respectively, said digital code converter comprising, in combination:

(a) a first plurality of conductors for carrying said first set of digital signals;

(b) a second plurality of conductors for carrying said second set of digital signals;

(c) a third plurality of conductors for carrying said third set of digital signals;

(d) a first plurality of logic circuits each having a plurality of inputs and an output and each operable to produce a signal on the output thereof when a predetermined combination of the inputs thereof is energized and to produce a signal on each input of said predetermined combination thereof when the output thereof is energized, the output of each of said logic circuits being coupled to a corresponding one of said third plurality of conductors, the inputs of each of said logic circuits being coupled to corresponding conductors of said first plurality of conductors in accordance with said first and third digital codes in such manner as to effect a conversion of data between said first and third codes, whereby the application of a first set of digital signals to said first plurality of conductors produces a corresponding third set of digital signals in said third plurality of conductors, and the application of a third set of digital signals to said third plurality of conductors produces a corresponding first set of digital signals in said first plurality of conductors;

(e) a second plurality of logic circuits each having a plurality of inputs and an output and each operable to produce a signal on the output thereof when a predetermined combination of the inputs thereof is energized and to produce a signal on each input of said predetermined combination thereof when the output thereof is energized, the output of each of said logic circuits being coupled to a corresponding one of said third plurality of conductors, the inputs of each said logic circuits being coupled to corresponding conductors of said second plurality of conductors in accordance with said second and third digital codes in such manner as to effect a conversion of data between said second and third codes, whereby the application of a second set of digital signals to said second plurality of conductors produces a corresponding third set of digital signals in said third plurality of conductors, and the application of a third set of digital signals to said third plurality of conductors produces a corresponding second set of digital signals in said second plurality of conductors.

7. A three-way digital code converter as defined in claim 6 wherein each logic circuit in said first and second plurality of logic circuits comprises an AND-circuit.

8. A three-way digital code converter as defined in claim 6 wherein said first and second plurality of conductors each contains twice as many conductors as there are signals in the corresponding set of digital signals, said conductors being associated together in pairs, and further comprising a signal inverter coupled between each pair of conductors, whereby each pair of conductors carries one digital signal of the corresponding set of digital signals and the inverse of said one digital signal.

9. A three-way digital code converter as defined in claim 8 wherein each logic circuit in said first and second plurality of logic circuits comprises an AND-circuit.

10. A three-way digital code converter as defined in claim 9 wherein each of said AND-circuits comprises a diode AND-circuit.

References Cited

UNITED STATES PATENTS 3,021,065 2/1962 Reynolds ---------- 340—347

MAYNARD R. WILBUR, *Primary Examiner.*

W. J. KOPACZ, *Assistant Examiner.*